United States Patent [19]

Marshall

[11] Patent Number: 5,384,772
[45] Date of Patent: Jan. 24, 1995

[54] METHOD AND APPARATUS FOR AUDIO FLOW CONTROL DURING TELECONFERENCING

[75] Inventor: R. Al Marshall, Portland, Oreg.

[73] Assignee: Intel Corporation, Santa Clara, Calif.

[21] Appl. No.: 115,345

[22] Filed: Sep. 1, 1993

[51] Int. Cl.$^6$ .............................................. H04L 12/18
[52] U.S. Cl. ........................................ 370/60; 370/62; 379/202
[58] Field of Search ................. 370/60, 60.1, 62, 94.1; 379/202

[56] References Cited

U.S. PATENT DOCUMENTS

| | | | |
|---|---|---|---|
| 4,792,942 | 12/1988 | Osato | 370/62 X |
| 4,953,159 | 8/1990 | Hayden et al. | 370/62 |
| 5,127,001 | 6/1992 | Steagall et al. | 370/62 |
| 5,317,567 | 5/1994 | Champion | 370/62 |

Primary Examiner—Melvin Marcelo
Attorney, Agent, or Firm—Steve Mendelsohn; William H. Murray

[57] ABSTRACT

Methods, apparatuses, and systems for processing audio data for a teleconference. A preferred system has a bridge terminal and a plurality of client terminals configured on a local area network. The bridge terminal intermittently receives packets of audio data from each client terminal, selectively mixes the audio data, and transmits packets of mixed audio data to the client terminals. The rate at which the bridge terminal mixes data is preferably greater than the rates at which the client terminals capture and play back audio data. Each client terminal implements special processing to determine how to handle each new packet of mixed audio data received from the bridge terminal. The special processing is based on the number of packets in the receiving buffer of the client terminal.

34 Claims, 2 Drawing Sheets

METHOD AND APPARATUS FOR AUDIO FLOW CONTROL DURING TELECONFERENCING

BACKGROUND OF THE INVENTION

1. Field of the Invention

The present invention relates to audio data processing, and, in particular, to methods and apparatuses for controlling the flow of audio data during teleconferencing.

2. Description of the Related Art

It is desirable to provide a system for teleconferencing between a plurality of terminals operating on a local area network (LAN), where each terminal comprises a computer, an audio capture device, and an audio playback device. In order to provide teleconferencing between the terminals, audio data from each terminal is transmitted in "packets" of data over the LAN to each of the other terminals.

If the flow of audio data over the LAN and if the capture and playback processing of the audio data by the terminals are not properly controlled, the quality of the audio playback at the receiving terminals will suffer. The flow of audio data to the terminals over a LAN must be carefully regulated, because:

- Local area networks typically do not guarantee the delivery of packets of audio data in an exact period of time;
- The clocks of the computers on the LAN and the audio capture and playback devices controlled by those computers are typically not synchronized; and
- Some audio playback devices obtain their digital sound information by accessing a fixed memory buffer via direct memory access.

If, for example, a receiving terminal is overwhelmed with audio data, that is, if the flow of audio data to the terminal exceeds the capability of the terminal's audio playback device, then increased audio latency may occur. Audio latency refers to the delay between one teleconference participant's speech and the rendition of that speech on the terminals of the other teleconference participants. If the audio latency gets sufficiently large, the quality of the teleconference will become unacceptably low.

On the other hand, if a receiving terminal is intermittently starved of audio data, that is, if the flow of audio data to the terminal become too low, then rhythmic breakup may occur. Rhythmic breakup refers to the periods of silence that occur when the supply of audio data is insufficient for the buffering requirements of an audio playback device. Like large audio latency, rhythmic breakup also diminishes the quality of the teleconference.

What is needed is a system for teleconferencing between terminals on a LAN that reduces the problems of audio latency and rhythmic breakup associated with too much and too little data, respectively.

It is accordingly an object of this invention to overcome the disadvantages and drawbacks of the known art and to provide a system for teleconferencing between a plurality of terminals on a LAN.

It is a further object of this invention to provide a teleconferencing system that controls the flow of audio data over a LAN.

It is a further object of this invention to provide a teleconferencing system that controls the processing of audio data at the terminals.

It is a further object of this invention to provide a teleconferencing system that reduces problems of audio latency and rhythmic breakup associated with too much and too little data, respectively.

Further objects and advantages of this invention will become apparent from the detailed description of a preferred embodiment which follows.

SUMMARY OF THE INVENTION

According to a preferred embodiment, the present invention is a teleconferencing system, comprising a plurality of client terminals and a bridge terminal. Each of the client terminals transmits audio data to the bridge terminal. The bridge terminal mixes the audio data from the client terminals and transmits mixed audio data to the client terminals.

According to an alternative preferred embodiment, the present invention is an apparatus for providing teleconferencing between a plurality of client terminals. The apparatus comprises a receiver for receiving audio data from each of the client terminals, a controller for selectively mixing the audio data, and a transmitter for transmitting the selectively mixed audio data to the client terminals.

According to another alternative preferred embodiment, the present invention is a method and apparatus for processing audio data in a teleconference. According to this embodiment, a new packet of audio data is received. The new packet and a silent packet are added to a receiving buffer, if the number of packets in the receiving buffer is less than a first threshold. The new packet is added to the receiving buffer, if the number of packets in the receiving buffer is less than a second threshold but not less than the first threshold, where the second threshold is greater than the first threshold. The amount of information in the new packet is characterized, if the number of packets in the receiving buffer is less than a third threshold but not less than the second threshold, where the third threshold is greater than the second threshold. The new packet is added to the receiving buffer, if the amount of information in the new packet is not less than an information level threshold. The new packet is skipped, if the amount of information in the new packet is less than the information level threshold. The new packet is skipped, if the number of packets in the receiving buffer is not less than the third threshold. The data in the receiving buffer is processed to playback the audio data.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

Figure 1:
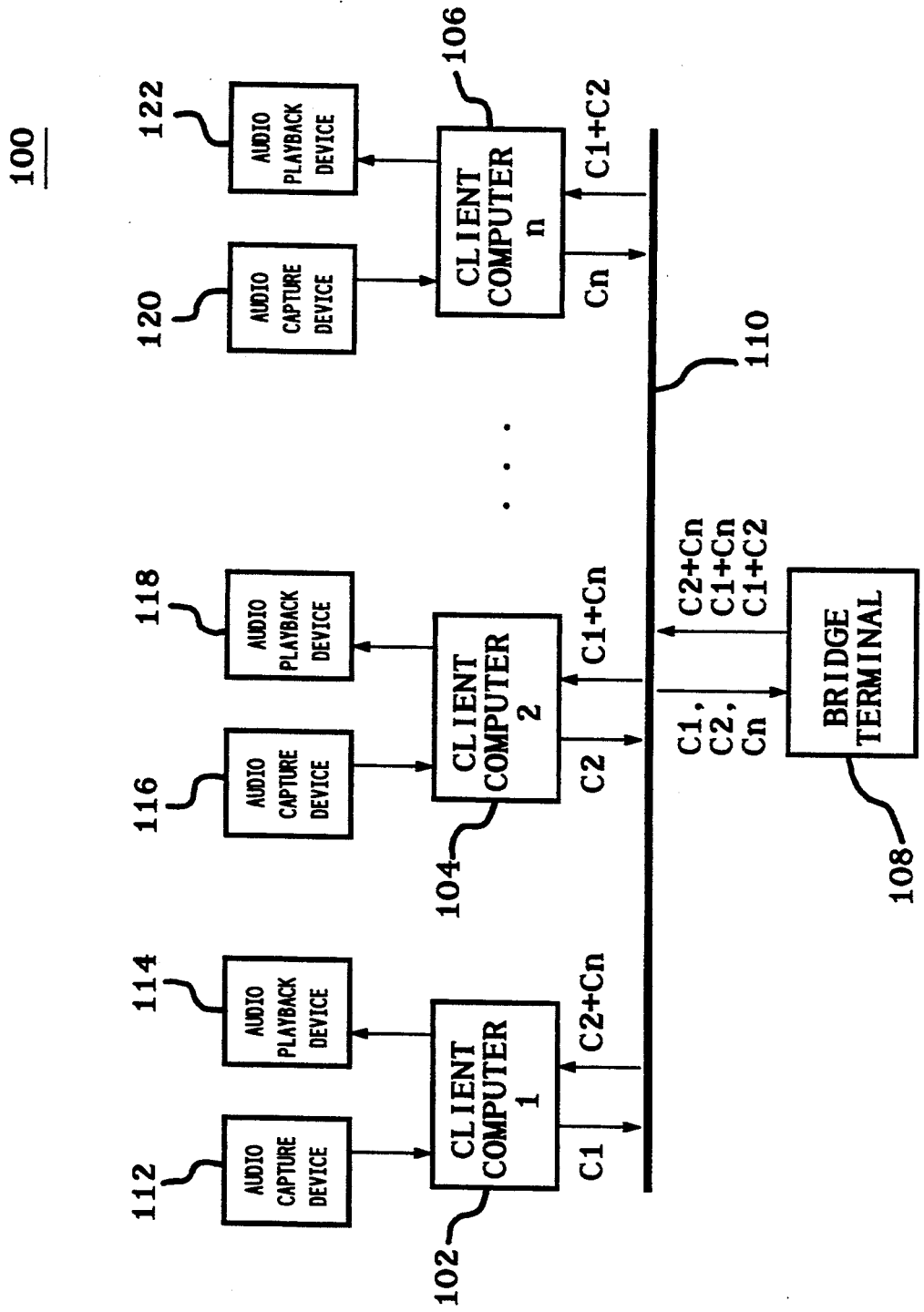
FIG. 1 is a block diagram of a teleconferencing system, according to a preferred embodiment of the present invention.

Referring now to FIG. 1, there is shown a block diagram of teleconferencing system 100, according to a preferred embodiment of the present invention. System 100 comprises a bridge terminal 108 and n client terminals operating on a local area network (LAN) 110, where n is an integer greater than one. Each of the client terminals comprises a client computer, an audio capture device, and an audio playback device. Each client terminal captures and transmits audio data to bridge terminal 108 via LAN 110. Bridge terminal selectively mixes (i.e., preferably combines by simple addition) the received audio data and transmits mixed audio data back to the client terminals via LAN 110 for playback.

More particularly, audio capture device 112 of system 100 captures the audio portion of a first participant in a teleconference as digital audio data C1. Client computer 102 transmits audio data C1 as fixed-size data packets to bridge terminal 108 via LAN 110. Similarly, audio capture devices 116 through 120 capture the audio portion of the second through nth teleconference participants as digital audio data C2 through Cn, respectively. Client computers 104 through 106 transmit audio data C2 through Cn, respectively, as fixed-size data packets to bridge terminal 108 via LAN 110. For example, when sound is captured at a rate of 8000 samples/second, the size of the data packets is preferably 1024 bytes (i.e., slightly more than $\frac{1}{8}$ second of sound per data packet), but the size may be different for alternative preferred embodiments.

Bridge terminal 108 selectively mixes the audio data from the n client terminals and transmits packets of mixed audio data back to the client terminals. For each participant i, bridge terminal 108 mixes audio data from all the client terminals except for audio data Ci from client terminal i. Bridge terminal 108 then returns the resulting packet of mixed audio data to client computer i via LAN 110 for playback. Thus, for example, as depicted in FIG. 1, client computer 102 receives mixed audio data C2+Cn corresponding to audio data from all teleconference participants except for the audio data from the first participant. Audio playback device 114 then performs playback of mixed audio data C2+Cn.

Bridge terminal 108 preferably comprises a receiver for receiving for receiving audio data from each of the client terminals over LAN 110, a controller for selectively mixing the audio data, and a transmitter for transmitting the mixed audio data back to the client terminals over LAN 110. The receiver of bridge terminal 108 may be a set of conventional data buffers for receiving digital data from a local area network. The controller of bridge terminal 108 may be a conventional personal computer. The transmitter of bridge terminal 108 may be a set of conventional data buffers for transmitting digital data to a local area network.

In a preferred embodiment, bridge terminal 108 comprises an Intel ® Express 50 MHz 486 machine with buffers sized for receiving and transmitting the audio data packets from and to Microsoft ® Windows For WorkGroups NetBIOS. Bridge terminal 108 preferably implements a computer program running under Microsoft ® Windows that cyclically checks the input buffers, mixes audio data, and fills the output buffers, sending the resultant output buffers to Microsoft ® Windows For WorkGroups NetBIOS.

Client computers 102, 104, . . . , 106 may be conventional personal computers and are preferably Intel ® Express 50 MHz 486 machines. Audio capture devices 112, 116, . . . , 120 may be conventional devices for capturing sound as digital audio data and are preferably SoundBlaster Pro audio cards sold by Creative Labs Inc. Audio playback devices 114, 118, . . . , 122 may be conventional devices for performing playback of digital audio data and are preferably SoundBlaster Pro audio cards sold by Creative Labs Inc. Local area network 110 may be any conventional system for networking multiple personal computers and is preferably an Ethernet LAN.

Figure 2:
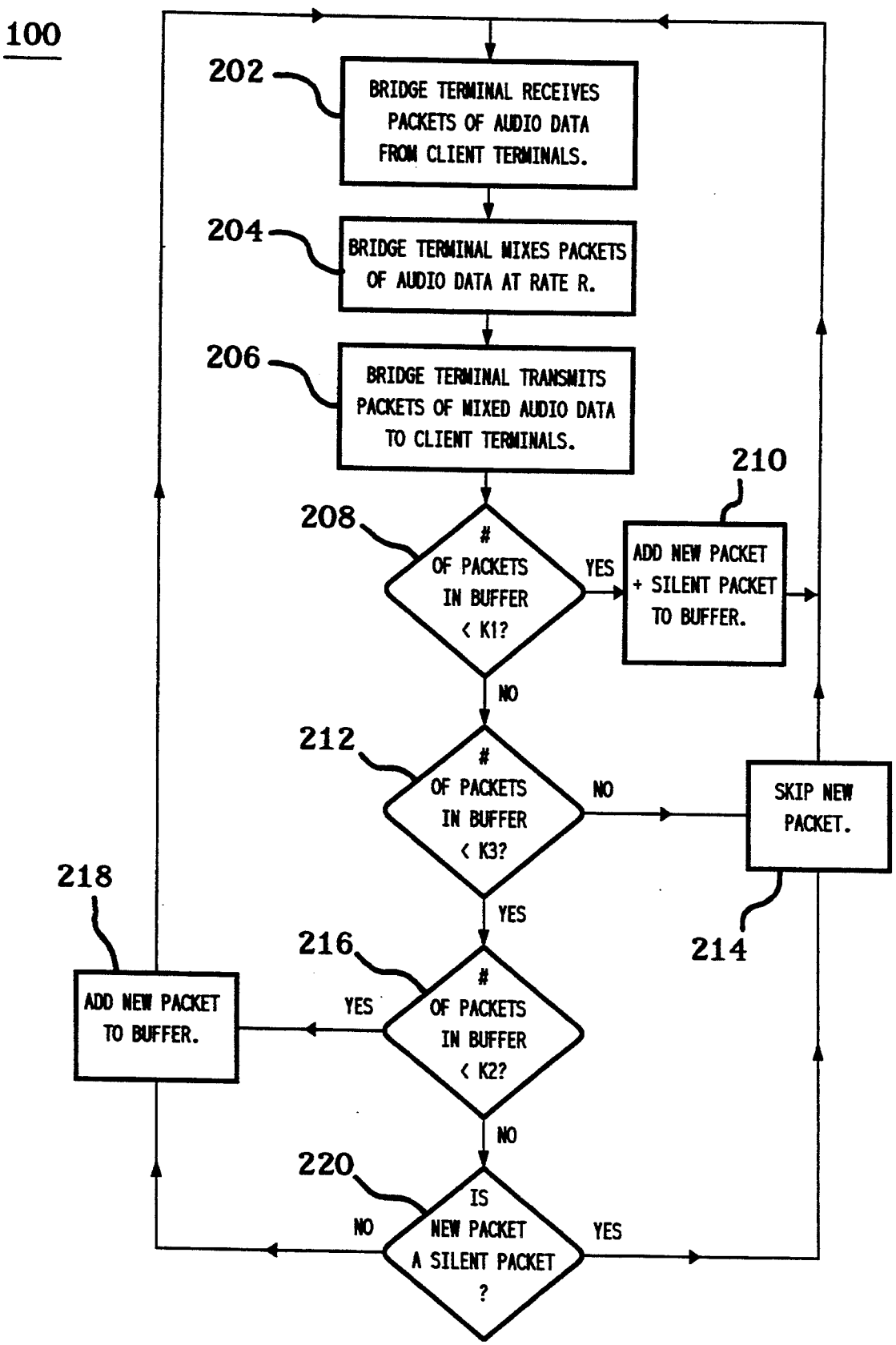
FIG. 2 is a process flow diagram of the processing implemented by the teleconferencing system of FIG. 1.

Referring now to FIG. 2, there is shown a process flow diagram of the preferred processing implemented by teleconferencing system 100 of FIG. 1. The processing of system 100 controls the mixing of packets of audio data by bridge terminal 108 as well as the handling of the packets of mixed audio data received by the client terminals.

The processing of system 100 may be tuned by selecting values for four control parameters: R, K1, K2, and K3. R is the rate at which bridge terminal 108 mixes packets of audio data received from the various client terminals. In a preferred embodiment, rate R is set to be slightly greater than the average rate at which audio data packets are received from each client terminal. In a preferred embodiment, the rate R is also slightly greater than the average rate at which the client terminals are able to process the received packets of mixed audio data. The parameters K1, K2, and K3 correspond to numbers of mixed data packets in the receiving buffer of a client terminal. In a preferred embodiment, $K1 < K2 < K3$.

Referring again to FIG. 2, at block 202, bridge terminal 108 receives packets of audio data from the client terminals over the LAN at random intervals. At block 204, bridge terminal 108 mixes the packets of audio data at the specified rate R according to the mixing rule whereby each client terminal is to receive mixed audio data corresponding to the combination of audio data from every other client terminal (as described earlier in this specification in conjunction with FIG. 1).

Since the mixing rate is slightly higher than the average rate at which bridge terminal 108 receives audio data packets from the individual client terminals, bridge terminal may not have new audio data from one or more of the client terminals in a given mixing cycle. In this case, bridge terminal 108 considers a silent packet (i.e., a packet containing only audio samples representing absolute silence) to be the contribution from those client terminals for that particular mixing cycle.

At block 206, bridge terminal 108 transmits the various packets of mixed audio data via LAN 110 to the appropriate client terminals.

The processing depicted in blocks 208–220 of FIG. 2 is performed by each of the client terminals with no synchronization with the other client terminals. When a new packet of mixed audio data is received by a client terminal, the number of packets of mixed audio data currently in the receiving buffer of the client terminal is checked to determine how to handle the new packet. The handling of the new packet differs depending upon whether the number of packets currently in the buffer is less than K1, between K1 and K2, between K2 and K3, or greater than or equal to K3.

If the number of packets currently in the receiving buffer is less than the specified parameter K1 (see block 208), then the new packet is added to the end of the buffer along with a silent packet of equal size (see block 210). Those skilled in the art will understand that the processing of block 208 and 210 will have the long-term effect of preventing playback in which the audio playback device plays broken sound in return for a small short-term playback interruption.

If the number of packets in the buffer is not less than the specified parameter K3 (see block 212), then the new packet is skipped (i.e., not added to the buffer) (see block 214).

If the number of packets in the buffer is not less than the specified parameter K1, but is less than the specified parameter K2 (see block 216), then the new packet is added to the end of the receiving buffer (see block 218).

If the number of packets in the buffer is not less than the specified parameter K2, but is less than the specified parameter K3 (see block 216), then the new packet is checked to see if it is a silent packet (see block 220). If so, then the new packet is skipped (see block 214); otherwise, it is added to the end of the buffer (see block 218). In a preferred embodiment, the new packet is checked for silence by a cursory inspection of only some of the bits of the packet.

After handling the new packet of mixed audio data, FIG. 2 depicts the processing of system 100 returning to block 202 to indicate that the processing of system 100 is repeated. In reality, the processing of each of bridge terminal 108 and the client terminals is repeated independently of and concurrently with the processing of each other.

Those skilled in the art will understand that the preferred processing of system 100 as depicted in FIG. 2 reduces the problems of audio latency and rhythmic breakup associated with too much and too little data, respectively.

Those skilled in the art will also understand that the present invention comprises alternative embodiments other than those described in conjunction with FIGS. 1 and 2. For example, in an alternative preferred embodiment, audio data packets are conveyed to and from the bridge terminal via multiple full-duplex (i.e., 2-channel bi-directional) communication lines, such as digital phone lines, where there is one communication line per bridge-client connection. Those skilled in the art will understand that the network of this alternative preferred embodiment resembles a star with the bridge terminal at the center and the client terminals on the outside at the end of individual communication lines. Yet another alternative preferred embodiment would be a token ring network.

Those skilled in the art will also understand that in alternative preferred embodiments of the present invention, the client terminals may skip "near-silence" packets in addition to skipping "absolute silence" packets. In such embodiments, the client terminal may analyze a received data packet to characterize the amount of information contained in the packet. The client terminal may then determine whether to skip the packet or add it to the receiving buffer by comparing the characterized amount of information to an information level threshold. If the amount of information is less than the information level threshold, then the packet is skipped; otherwise, the packet is added to the receiving buffer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A teleconferencing system, comprising:

(a) a plurality of client terminals; and
(b) a bridge terminal, wherein each of said client terminals transmits audio data to said bridge terminal and said bridge terminal mixes said audio data from said client terminals and transmits mixed audio data to said client terminals, wherein said bridge terminal mixes audio data selectively, whereby each client terminal receives mixed audio data corresponding to each other client terminal.

2. The system of claim 1, further comprising a local area network, wherein said client terminals and said bridge terminal transmit and receive audio data over said local area network.

3. The system of claim 1, wherein each of said client terminals comprises a computer, an audio capture device for capturing said audio data, and an audio playback device for playing said received mixed audio data.

4. The system of claim 1, wherein a client terminal of said plurality of client terminals:

receives a new packet of said mixed audio data;
adds said new packet and a silent packet to a receiving buffer of said client terminal, if the number of packets in said receiving buffer is less than a first threshold;
adds said new packet to said receiving buffer, if the number of packets in said receiving buffer is less than a second threshold but not less than said first threshold, wherein said second threshold is greater than said first threshold;
characterizes the amount of information in said new packet, if the number of packets in said receiving buffer is less than a third threshold but not less than said second threshold, wherein said third threshold is greater than said second threshold;
adds said new packet to said receiving buffer, if the amount of information in said new packet is not less than an information level threshold;
skips said new packet, if the amount of information in said new packet is less than said information level threshold;
skips said new packet, if the number of packets in said receiving buffer is not less than said third threshold; and
processes the data in said receiving buffer to playback said mixed audio data.

5. The system of claim 1, wherein said bridge terminal mixes audio data at a rate greater than the average rate at which said bridge terminal receives audio data from said client terminals.

6. The system of claim 5, wherein said bridge terminal mixes a silent packet for each of said client terminals for which said bridge terminal has no new audio data.

7. The system of claim 1, wherein said bridge terminal mixes audio data at a rate greater than the average rate at which said plurality of client terminals process said packet of mixed audio data.

8. An apparatus for providing teleconferencing between a plurality of client terminals, comprising:

(a) a receiver for receiving audio data from each of said client terminals;
(b) a controller for selectively mixing said audio data; and
(c) a transmitter for transmitting said selectively mixed audio data to said client terminals, wherein said controller mixes audio data at a rate greater than the average rate at which said receiver receives audio data from said client terminals and wherein said controller mixes a silent packet for each of said client terminals for which said receiver has no new audio data.

9. The apparatus of claim 8, wherein said controller mixes audio data at a rate greater than the average rate at which said plurality of client terminals process said mixed audio data.

10. A method for processing audio data received by a client terminal of a plurality of client terminals in a teleconference, comprising the steps of:
(a) receiving a new packet of said audio data;
(b) adding said new packet and a silent packet to a receiving buffer of said client terminal, if the number of packets in said receiving buffer is less than a first threshold;
(c) adding said new packet to said receiving buffer, if the number of packets in said receiving buffer is less than a second threshold but not less than said first threshold, wherein said second threshold is greater than said first threshold;
(d) characterizing the amount of information in said new packet, if the number of packets in said receiving buffer is less than a third threshold but not less than said second threshold, wherein said third threshold is greater than said second threshold;
(e) adding said new packet to said receiving buffer, if the amount of information in said new packet is not less than an information level threshold;
(f) skipping said new packet, if the amount of information in said new packet is less than said information level threshold;
(g) skipping said new packet, if the number of packets in said receiving buffer is not less than said third threshold; and
(h) processing the data in said receiving buffer to playback said audio data.

11. The method of claim 10, wherein said new packet is a mixed packet of audio data corresponding to one or more other client terminals in said teleconference.

12. The method of claim 10, wherein said new packet is generated by a bridge terminal at a rate greater than the average rate at which said bridge terminal receives audio data from said client terminals.

13. The method of claim 12, wherein said bridge terminal mixes a silent packet for each of said client terminals for which said bridge terminal has no new audio data.

14. The method of claim 10, wherein said new packet is generated by a bridge terminal at a rate greater than the average rate at which said plurality of client terminals process said packet of mixed audio data.

15. An apparatus for processing audio data in a teleconference, comprising:
(a) a client computer for:
  receiving a new packet of said audio data;
  adding said new packet and a silent packet to a receiving buffer of said client computer, if the number of packets in said receiving buffer is less than a first threshold;
  adding said new packet to said receiving buffer, if the number of packets in said receiving buffer is less than a second threshold but not less than said first threshold, wherein said second threshold is greater than said first threshold;
  characterizing the amount of information in said new packet, if the number of packets in said receiving buffer is less than a third threshold but not less than said second threshold, wherein said third threshold is greater than said second threshold;
  adding said new packet to said receiving buffer, if the amount of information in said new packet is not less than an information level threshold;
  skipping said new packet, if the amount of information in said new packet is less than said information level threshold; and
  skipping said new packet, if the number of packets in said receiving buffer is not less than said third threshold; and
(b) an audio playback device for processing the data in said receiving buffer to playback said audio data.

16. The apparatus of claim 15, wherein said new packet is a mixed packet of audio data corresponding to one or more other client computers in said teleconference.

17. The apparatus of claim 15, wherein said new packet is generated by a bridge terminal at a rate greater than the average rate at which said bridge terminal receives audio data from one or more other client computers in said teleconference.

18. The apparatus of claim 17, wherein said bridge terminal mixes a silent packet for each of said client computers for which said bridge terminal has no new audio data.

19. The apparatus of claim 15, wherein said new packet is generated by a bridge terminal at a rate greater than the average rate at which said client computer processes said packet of mixed audio data.

20. A method for processing audio data in a teleconference, comprising the steps of:
(a) generating packets of audio data by a plurality of client terminals, wherein each of said client terminals comprises a computer, an audio capture device for capturing said audio data, and an audio playback device for playing audio data;
(b) transmitting said packets of audio data from said client terminals to a bridge terminal over a local area network, wherein said bridge terminal comprises a receiver for receiving audio data from each of said client terminals, a controller for selectively mixing said audio data, and a transmitter for transmitting said selectively mixed audio data to said client terminals;
(c) selectively mixing said packets by said bridge terminal at a rate greater than the average rate at which said bridge terminal receives said packets of audio data from said client terminals and greater than the average rate at which said client terminals process packets of audio data, wherein said bridge terminal mixes a silent packet for each of said client terminals for which said bridge terminal has no new audio data;
(d) transmitting a new packet of mixed audio data to a client terminal of said plurality of client terminals over said local area network, wherein said new packet corresponds to audio data from each of the other client terminal of said plurality of client terminals;
(e) adding said new packet and a silent packet to a receiving buffer of said client terminal, if the number of packets in said receiving buffer is less than a first threshold;
(f) adding said new packet to said receiving buffer, if the number of packets in said receiving buffer is less than a second threshold but not less than said first threshold, wherein said second threshold is greater than said first threshold;

(g) characterizing the amount of information in said new packet, if the number of packets in said receiving buffer is less than a third threshold but not less than said second threshold, wherein said third threshold is greater than said second threshold;

(h) adding said new packet to said receiving buffer, if the amount of information in said new packet is not less than an information level threshold;

(i) skipping said new packet, if the amount of information in said new packet is less than said information level threshold;

(j) skipping said new packet, if the number of packets in said receiving buffer is not less than said third threshold: and (k) processing the data in said receiving buffer to playback said audio data.

21. A teleconferencing system, comprising:

(a) a local area network;

(b) a plurality of client terminals, configured on said local area network, wherein each of said client terminals comprises a computer, an audio capture device for capturing audio data, and an audio playback device for playing audio data; and (c) a bridge terminal, configured on said local area network, wherein said bridge terminal comprises a receiver for receiving audio data from each of said client terminals, a controller for selectively mixing said audio data, and a transmitter for transmitting said selectively mixed audio data to said client terminals, wherein:

each of said plurality of client terminals:
generates packets of audio data; and
transmits said packets of audio data to said bridge terminal over said local area network;

said bridge terminal:
selectively mixes said packets at a rate greater than the average rate at which said bridge terminal receives said packets of audio data from said client terminals and greater than the average rate at which said client terminals process packets of audio data, wherein said bridge terminal mixes a silent packet for each of said client terminals for which said bridge terminal has no new audio data;
transmits a new packet of mixed audio data to a one client terminal of said plurality of client terminals over said local area network, wherein said new packet corresponds to audio data from each of the other client terminal of said plurality of client terminals; and said one client terminal:
adds said new packet and a silent packet to a receiving buffer of said one client terminal, if the number of packets in said receiving buffer is less than a first threshold;
adds said new packet to said receiving buffer, if the number of packets in said receiving buffer is less than a second threshold but not less than said first threshold, wherein said second threshold is greater than said first threshold;
characterizes the amount of information in said new packet, if the number of packets in said receiving buffer is less than a third threshold but not less than said second threshold, wherein said third threshold is greater than said second threshold;

adds said new packet to said receiving buffer, if the amount of information in said new packet is not less than an information level threshold;
skips said new packet, if the amount of information in said new packet is less than said information level threshold;
skips said new packet, if the number of packets in said receiving buffer is not less than said third threshold; and
said audio playback device processes the data in said receiving buffer to playback said audio data.

22. A teleconferencing system, comprising:

(a) a plurality of client terminals; and (b) a bridge terminal, wherein each of said client terminals transmits audio data to said bridge terminal and said bridge terminal mixes said audio data from said client terminals and transmits mixed audio data to said client terminals, wherein a client terminal of said plurality of client terminals:

receives a new packet of said mixed audio data;
adds said new packet and a silent packet to a receiving buffer of said client terminal, if the number of packets in said receiving buffer is less than a first threshold;
adds said new packet to said receiving buffer, if the number of packets in said receiving buffer is less than a second threshold but not less than said first threshold, wherein said second threshold is greater than said first threshold;
characterizes the amount of information in said new packet, if the number of packets in said receiving buffer is less than a third threshold but not less than said second threshold, wherein said third threshold is greater than said second threshold;
adds said new packet to said receiving buffer, if the amount of information in said new packet is not less than an information level threshold;
skips said new packet, if the amount of information in said new packet is less than said information level threshold;
skips said new packet, if the number of packets in said receiving buffer is not less than said third threshold; and
processes the data in said receiving buffer to playback said mixed audio data.

23. The system of claim 22, further comprising a local area network, wherein said client terminals and said bridge terminal transmit and receive audio data over said local area network.

24. The system of claim 22, wherein each of said client terminals comprises a computer, an audio capture device for capturing said audio data, and an audio playback device for playing said received mixed audio data.

25. The system of claim 22, wherein said bridge terminal mixes audio data selectively, whereby each client terminal receives mixed audio data corresponding to each other client terminal.

26. The system of claim 22, wherein said bridge terminal mixes audio data at a rate greater than the average rate at which said bridge terminal receives audio data from said client terminals.

27. The system of claim 26, wherein said bridge terminal mixes a silent packet for each of said client terminals for which said bridge terminal has no new audio data.

28. The system of claim 22, wherein said bridge terminal mixes audio data at a rate greater than the average rate at which said plurality of client terminals process said packet of mixed audio data.

29. A teleconferencing system, comprising:
(a) a plurality of client terminals; and
(b) a bridge terminal, wherein:
   each of said client terminals transmits audio data to said bridge terminal;
   said bridge terminal mixes said audio data from said client terminals and transmits mixed audio data to said client terminals;
   said bridge terminal mixes audio data at a rate greater than the average rate at which said bridge terminal receives audio data from said client terminals; and
   said bridge terminal mixes a silent packet for each of said client terminals for which said bridge terminal has no new audio data.

30. The system of claim 29, further comprising a local area network, wherein said client terminals and said bridge terminal transmit and receive audio data over said local area network.

31. The system of claim 29, wherein each of said client terminals comprises a computer, an audio capture device for capturing said audio data, and an audio playback device for playing received mixed audio data.

32. The system of claim 29, wherein said bridge terminal mixes audio data selectively, whereby each client terminal receives mixed audio data corresponding to each other client terminal.

33. The system of claim 29, wherein a client terminal of said plurality of client terminals:
   receives a new packet of said mixed audio data;
   adds said new packet and a silent packet to a receiving buffer of said client terminal, if the number of packets in said receiving buffer is less than a first threshold;
   adds said new packet to said receiving buffer, if the number of packets in said receiving buffer is less than a second threshold but not less than said first threshold, wherein said second threshold is greater than said first threshold;
   characterizes the amount of information in said new packet, if the number of packets in said receiving buffer is less than a third threshold but not less than said second threshold, wherein said third threshold is greater than said second threshold;
   adds said new packet to said receiving buffer, if the amount of information in said new packet is not less than an information level threshold;
   skips said new packet, if the amount of information in said new packet is less than said information level threshold;
   skips said new packet, if the number of packets in said receiving buffer is not less than said third threshold; and
   processes the data in said receiving buffer to playback said mixed audio data.

34. The system of claim 29, wherein said bridge terminal mixes audio data at a rate greater than the average rate at which said plurality of client terminals process said packet of mixed audio data.

* * * * *

UNITED STATES PATENT AND TRADEMARK OFFICE
CERTIFICATE OF CORRECTION

PATENT NO. : 5,384,772
DATED : January 24, 1995
INVENTOR(S) : R. Al Marshall

It is certified that error appears in the above-indentified patent and that said Letters Patent is hereby corrected as shown below:

Column 3, line 24, delete "-".

Column 4, line 28, delete "K-" and insert therefor --K2--.

Column 4, line 29, delete "2".

Column 4, line 42, after "terminal" insert --108--.

Signed and Sealed this

Sixth Day of June, 1995

Attest:

BRUCE LEHMAN

Attesting Officer

Commissioner of Patents and Trademarks